(12) United States Patent
Nako et al.

(10) Patent No.: US 12,673,821 B2
(45) Date of Patent: Jul. 7, 2026

(54) AUTOMATED WAREHOUSE, AUTOMATED WAREHOUSE CONTROL METHOD, PROGRAM, AND AUTOMATED WAREHOUSE SYSTEM

(71) Applicant: Murata Machinery, Ltd., Kyoto (JP)

(72) Inventors: Taisuke Nako, Inuyama (JP); Hiroki Morisaki, Bungotakada (JP)

(73) Assignee: Murata Machinery, Ltd., Kyoto (JP)

( * ) Notice: Subject to any disclaimer, the term of this patent is extended or adjusted under 35 U.S.C. 154(b) by 805 days.

(21) Appl. No.: 17/793,678

(22) PCT Filed: Sep. 29, 2020

(86) PCT No.: PCT/JP2020/036913
§ 371 (c)(1),
(2) Date: Jul. 19, 2022

(87) PCT Pub. No.: WO2021/152912
PCT Pub. Date: Aug. 5, 2021

(65) Prior Publication Data
US 2023/0041684 A1 Feb. 9, 2023

(30) Foreign Application Priority Data
Jan. 30, 2020 (JP) ................................. 2020-013579

(51) Int. Cl.
B65G 1/137 (2006.01)
B65G 1/06 (2006.01)
B65G 60/00 (2006.01)
(52) U.S. Cl.
CPC ............. B65G 1/1373 (2013.01); B65G 1/06 (2013.01); B65G 60/00 (2013.01)

(58) Field of Classification Search
CPC ........ B65G 1/1373; B65G 1/06; B65G 60/00; B65G 1/137; B65G 1/0492; B65G 1/1378; G06Q 10/087
See application file for complete search history.

(56) References Cited

U.S. PATENT DOCUMENTS

2006/0239801 A1* 10/2006 Gudehus .............. B65G 1/0407
414/277
2012/0009047 A1* 1/2012 Ogawa ................... B65G 1/065
414/807

(Continued)

FOREIGN PATENT DOCUMENTS

JP H04-256607 A 9/1992
JP H09-030614 A 2/1997

(Continued)

OTHER PUBLICATIONS

International Search Report dated Dec. 1, 2020 in counterpart International Application No. PCT/JP2020/036913.

(Continued)

*Primary Examiner* — Timothy R Waggoner
(74) *Attorney, Agent, or Firm* — DLA Piper LLP (US)

(57) ABSTRACT
An automated warehouse includes shelves, a carrier, an elevator, and a controller. The shelves include a first shelf storing a first article and a second shelf which is larger than the first shelf and stores the first article and the second article. The carrier is provided at each shelf and transfers articles. The elevator moves articles up or down. When the vacancy rate of the second shelf is equal to or more than the predetermined ratio, the controller controls the carrier and the elevator to store the first article onto the second shelf. When the vacancy rate of the second shelf is less than the predetermined ratio, the controller controls the carrier and the elevator to store the first article only onto the first shelf.

9 Claims, 8 Drawing Sheets

(56)          References Cited

U.S. PATENT DOCUMENTS

2014/0163721  A1       6/2014   Ogawa et al.
2021/0395015  A1*    12/2021   Ahammer ............ B65G 1/0485

FOREIGN PATENT DOCUMENTS

| JP | H09-216705 | A | 8/1997 |
| JP | 2000-118631 | A | 4/2000 |
| JP | 2000-118639 | A | 4/2000 |
| JP | 2005-138956 | A | 6/2005 |
| JP | 2009-242058 | A | 10/2009 |
| JP | 2012-17188 | A | 1/2012 |
| JP | 2013-91555 | A | 5/2013 |
| JP | 2013-245046 | A | 12/2013 |
| JP | 2017-39597 | A | 2/2017 |

OTHER PUBLICATIONS

Written Opinion dated Dec. 1, 2020 in counterpart International Application No. PCT/JP2020036913.
Extended European Search Report dated Jan. 9, 2024, of counterpart European Patent Application No. 20916285.8.

* cited by examiner

FIG. 8

AUTOMATED WAREHOUSE, AUTOMATED WAREHOUSE CONTROL METHOD, PROGRAM, AND AUTOMATED WAREHOUSE SYSTEM

TECHNICAL FIELD

This disclosure relates to an automated warehouse where a plurality of shelves to store articles are provided and carriers to carry articles are installed at each shelf, a control method of the automated warehouse, program to cause computer to execute the control method, and an automated warehouse system including a plurality of the automated warehouses.

BACKGROUND

A known automated warehouse (an automated warehouse with a carrier installed at each shelf) includes a plurality of carriers that carry articles. Each of the carriers is installed at each of a plurality of shelves storing articles. The carrier travels on the corresponding shelf in the shelf extending direction and transfers articles between the carrier and the shelf at a predetermined position in the shelf extending direction (for example, refer to US 2014/0163721 A1).

To store different-sized articles in the above automated warehouse, for example, a distance between two shelves in a height direction ('storage height') is changeable in accordance with an article size. However, a change of the storage height in accordance with the article size will limit the size of article to be stored onto each shelf.

In the automated warehouse with a carrier installed at each shelf, when the size of an article capable of being stored at each shelf is limited and, for example, only a specific-sized article is required to be continuously stored onto an automated warehouse, only a carrier, which is placed on a shelf storing the specific-sized articles, works, while other carriers do not work. Thus, the throughput performance of the article handling decreases in the conventional automated warehouse system.

It could therefore be helpful to prevent an excessive access to a carrier installed on a specific shelf while providing shelves in accordance with the article size in an automated warehouse with a carrier installed at each shelf.

SUMMARY

We thus provide a plurality of automated warehouses, control methods, programs and systems described below. Any combination can be used as appropriate.

Our automated warehouse includes shelves, carriers, an elevator, and a controller.

A plurality of shelves are provided.

The carrier is installed on each of the shelves and carries an article.

The elevator moves the article up or down.

The controller controls the carrier and the elevator to store/retrieve the article onto/from each of the shelves.

The shelves include first shelves and second shelves. The first shelves stores first articles and the second shelves, which are larger than the first shelves, can store the first articles and second articles.

When the vacancy rate of the second shelf is equal to or more than a predetermined ratio, the controller allows the carrier and the elevator to store the first article also onto the second shelf. When the vacancy rate of the second shelf is less than the predetermined ratio, the controller controls the carrier and the elevator to store the first article only onto the first shelf.

The above automated warehouse includes a plurality of the first shelves and a plurality of the second shelves. The second shelf is larger than the first shelf. The first shelf stores first small articles and the second shelf stores both of the first articles and the second articles larger than the first articles. Therefore, different-sized articles such as the first articles and the second articles can be stored on the shelves provided in accordance with the article size.

In addition, the first articles can be stored on the second shelf capable of storing the second larger articles. Thus, the first articles can be stored on all of the shelves.

When the vacancy rate of the second shelf is equal to or more than the predetermined ratio, the controller allows the carrier and the elevator to store the first articles also onto the second shelf. When the vacancy rate of the second shelf is less than the predetermined ratio, the controller controls the carrier and the elevator to store the first article only onto the first shelf.

Whereby, in the above-described automated warehouse, when only a plurality of first articles are requested to be continuously stored onto shelves and vacancy rate of the second shelf is equal to or more than the predetermined ratio, the controller can control also the carrier installed on the second shelf to operate to store the first articles onto the second shelf. As a result, excessive access to the carrier installed on the first shelf to carry and transfer articles can be prevented.

When the same kinds of articles as the articles to be retrieved are stored on both of the first shelf and the second shelf, the controller may control the carrier and the elevator to retrieve the articles from the second shelf. This prevents the second shelf from being filled with the first articles and ensures a space to store the second article onto the second shelf.

The elevator preferably has an elevating platform capable of holding and lifting/lowering a plurality of articles. In this example, when at least one of the plurality of the articles held by the elevating platform is the second article, the controller may control the carrier and the elevator to store also the remaining articles onto the second shelf. Whereby, the second article that cannot be stored onto the first shelf and other articles are stored onto the second shelf together so that the frequency of stoppage at each shelf and/or the movement distance of the elevator can be reduced.

The elevator may have the elevating platform capable of holding and lifting/lowering a plurality of articles. In this example, when it is known, in storing a specific article, that other articles to be retrieved together with the specific article are stored on the second shelf at present, the controller may control the carrier and the elevator to store the specific article onto the second shelf on which the other articles are stored.

Whereby, the specific article and other articles can be carried by the elevator at the same time to retrieve these articles together so that the elevator can be efficiently used.

A 'group retrieval' means to retrieve a plurality of articles designated by the predetermined standard. To perform the group retrieval, the controller may control the carrier and the elevator to perform the group retrieval preferentially on a group including articles being stored on the second shelf among a plurality of groups subject to the group retrieval. Whereby, the second shelf can surely store the second articles without being filled with the first articles.

If a group to be retrieved includes any articles being stored on the second shelf, the controller may control the carrier and the elevator to preferentially retrieve the articles from the second shelf. Whereby, the second shelf can surely store the second articles without being filled with the first articles.

Our control method is a control method of automated warehouse including shelves, carriers, and an elevator. The shelf includes a first shelf storing a first article and a second shelf which is larger than the first shelf and capable of storing the first article and a second article larger than the first article.

The carrier is installed on each shelf and carries articles. The elevator moves articles up and down.

The control method of automated warehouse includes the steps of:

allowing the first article to be stored onto the second shelf when the vacancy rate of the second shelf is equal to or more than the predetermined ratio, determining the first article to be stored only onto the first shelf when the vacancy rate of the second shelf is less than the predetermined ratio, and causing the carrier and the elevator to store the first article onto the first shelf or the second shelf onto which the first article was determined to be stored.

In the above control method of automated warehouse, it is determined that the first article is allowed to be stored onto the second shelf when the vacancy rate of the second shelf is equal to or more than the predetermined ratio, and the first article is stored onto only the first shelf when the vacancy rate of the second shelf is less than the predetermined ratio.

Whereby, in the above automated warehouse, for example, when a plurality of the first article are requested to be continuously stored and the vacancy rate of the second shelf is equal to or more than the predetermined ratio, the controller allows also the carrier installed on the second shelf to operate to store the first articles onto the second shelf. As a result, excessive access to a carrier installed on the first shelf to carry and transfer articles can be prevented.

Our programs cause a computer to execute the above method.

Our automated warehouse system includes a first automated warehouse, a second automated warehouse, and a controller.

The first automated warehouse includes a third shelf storing a third article and a first carrier to carry the third article.

The second automated warehouse includes a fourth shelf, which is larger than the third shelf and capable of storing the third article and a fourth article, and a second carrier capable of carrying the third article and the fourth article. The fourth article is larger than the third article.

The controller controls the first carrier and the second carrier.

When the vacancy rate of the fourth shelf is equal to or more than the predetermined ratio, the controller allows the second carrier to store the third article also onto the fourth shelf and, when the vacancy rate of the fourth shelf is less than the predetermined ratio, the controller allows the first carrier to store the third article only onto the third shelf.

In the above automated warehouse system, when the vacancy rate of the fourth shelf of the second automated warehouse is equal to or more than the predetermined ratio, the controller allows the second carrier to store the third article also onto the fourth shelf and, when the vacancy rate of the fourth shelf is less than the predetermined ratio, the controller controls the second carrier to store the third article only onto the third shelf of the first automated warehouse.

With this configuration, in the above automated warehouse, for example, when a plurality of the third articles are requested to be continuously stored and vacancy rate of the fourth shelf is the predetermined ratio or more, the controller allows also the second carrier to operate to store the third article onto the fourth shelf. As a result, excessive access to the first carrier to carry articles can be prevented.

In the automated warehouse, shelves can be provided in accordance with the size of articles to be stored and the excessive access to a specific carrier in the automated warehouse can be prevented.

BRIEF DESCRIPTION OF THE DRAWINGS

FIG. 8 is a drawing showing entire configurations of automated warehouse system according to the second example.

REFERENCE SIGNS LIST

Figure 1:
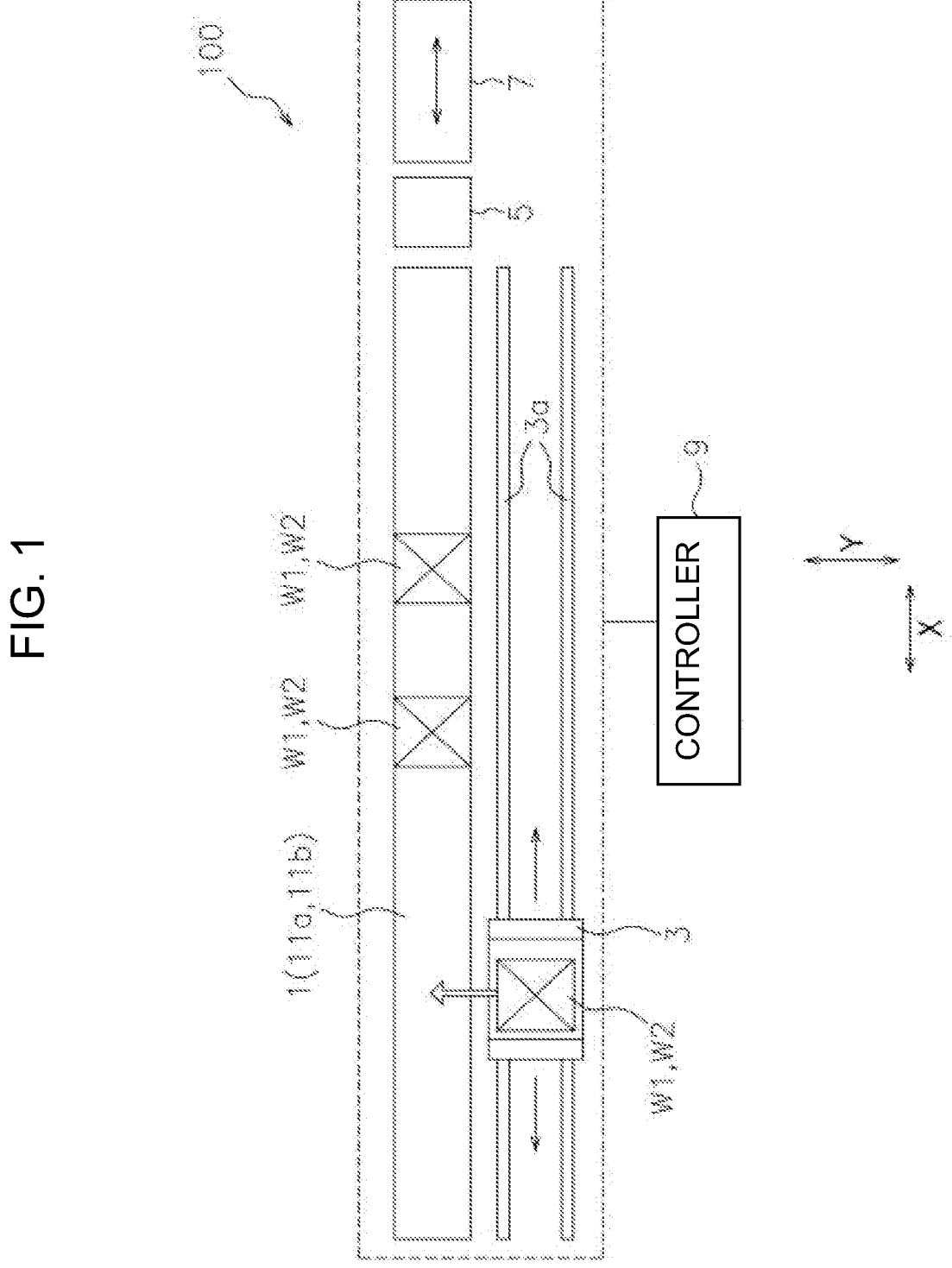
FIG. 1 is a top view of an automated warehouse system.

100: Automated warehouse
1: Rack
3: Carrier
3*a*: Rail
5: Elevator
51: Mast
53: Elevating platform
7: Storage/retrieval station
9: Controller
11*a*: First shelf
11*b*: Second shelf
13*a*: First shelf group
13*b*: Second shelf group
W1: First article
W2: Second article
200: Automated warehouse system
101: First automated warehouse
101*a*: Third shelf
101*b*: First carrier
103: Second automated warehouse
103*a*: Fourth shelf
103*b*: Second carrier
105: Controller
107: Conveyor
109: Storage/retrieval station
W3: Third article
W4: Fourth article

DETAILED DESCRIPTION

1. First Example (1) Automated Warehouse

Figure 2:
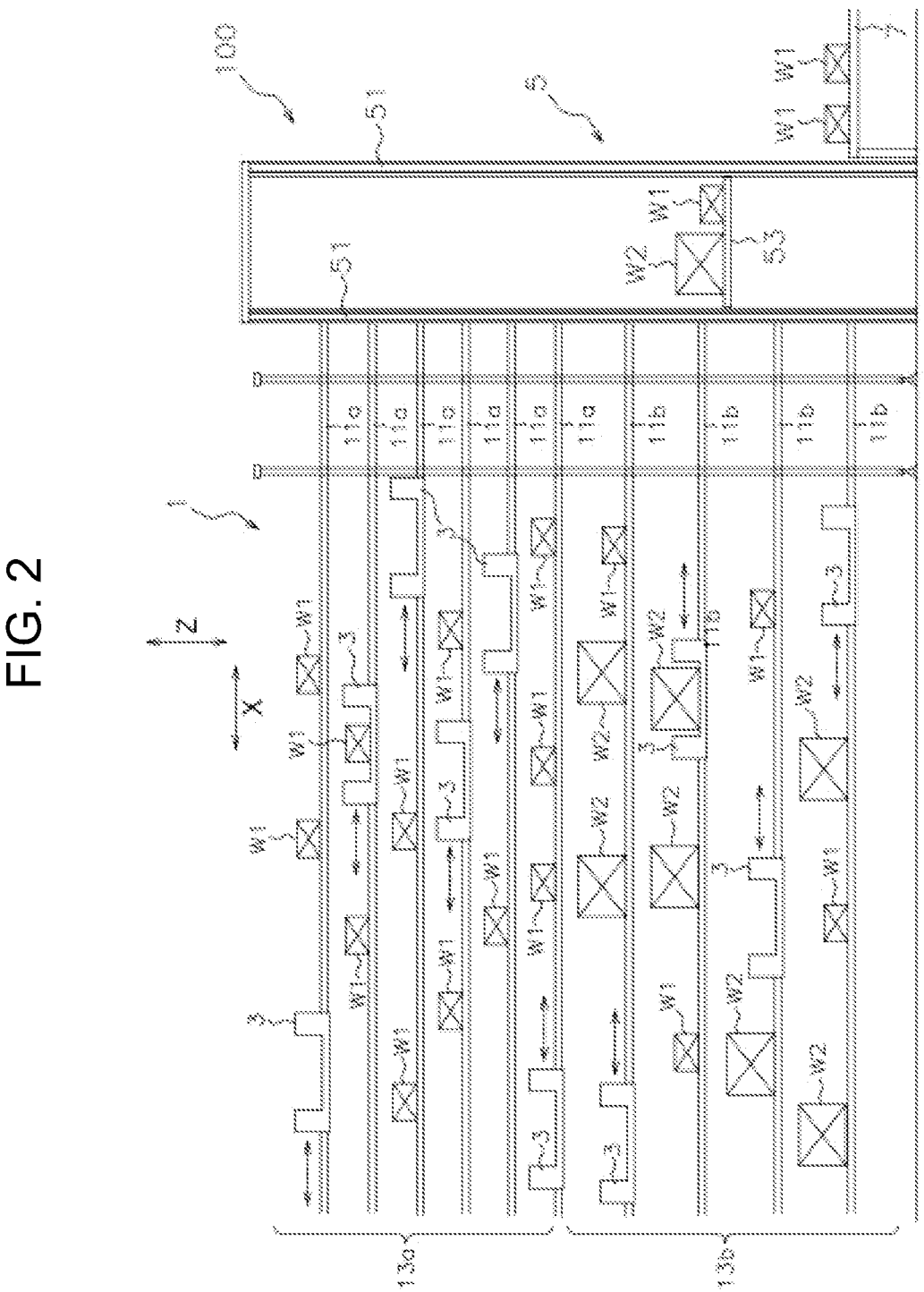
FIG. 2 is a side view of the automated warehouse system.
Figure 3:
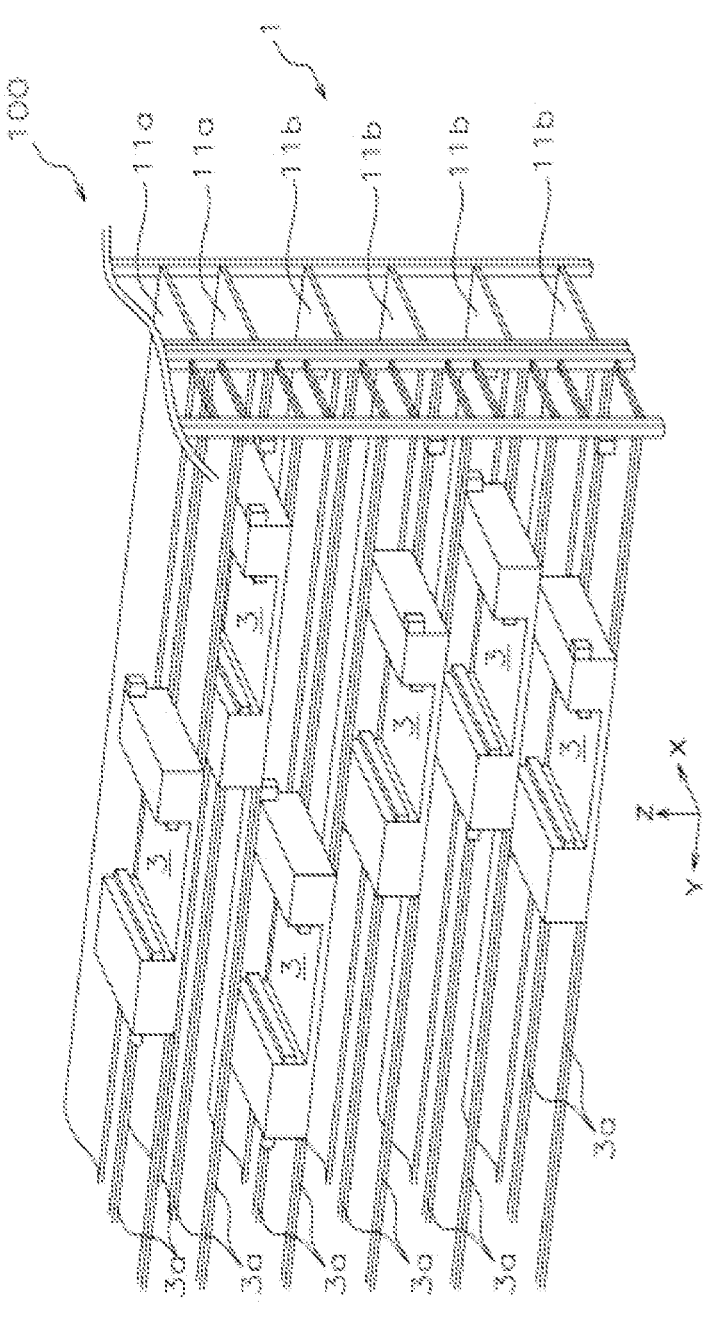
FIG. 3 is a perspective view of a carrier and a shelf.

With reference to FIGS. 1 to 3, an automated warehouse 100 according to a first example will be now described as follows. FIG. 1 is a top view of the automated warehouse. FIG. 2 is a side view of the automated warehouse. FIG. 3 is a perspective view of carriers and shelves. Hereinafter, the right and left direction of FIG. 1 is referred to as an X direction, the vertical direction of FIG. 1 is referred to as a Y direction, and the vertical direction of FIG. 2 is referred to as a Z direction (height direction). The automated warehouse 100 is a system that has a plurality of shelves and that is capable of storing articles onto each shelf or retrieving the stored article from each shelf. The automated warehouse 100 is provided with a rack 1, a plurality of carriers 3, an elevator 5, and a controller 9.

(2) Rack

A rack 1 includes a plurality of first shelves 11*a* and a plurality of second shelves 11*b*.

The first shelves 11*a* are disposed at a first interval in Z direction at the upper of the rack 1. Whereby, the first shelves 11*a* form a first shelf group 13*a* at the upper portion of the rack 1. The rack 1 includes six first shelves 11*a*, as a result, the rack 1 includes six first shelf groups 13*a*. Each of the plurality of first shelf groups 13*a* has a storage height of the first interval and is capable of storing only smaller and shorter articles W1.

As shown in FIGS. 1 and 3, the rack 1 is installed at one side of the carrier 3 (rail 3*a*) in Y direction, but it is not limited thereto. The rack 1 may be installed at both sides of the carrier 3 (rail 3*a*) in Y direction.

A plurality of the second shelves 11*b* are arranged at the lower part of the rack 1 in Z direction at a second interval which is larger than the first interval. Whereby, plurality of the second shelves 11*b* form a second shelf group 13*b* at the lower portion of the rack 1. The rack 1 includes four second shelves 11*b*, as a result, the rack 1 includes four second shelf groups 13*b*.

The storage height of the second shelf group 13*b* is a second interval which is larger than the first interval and is higher than the storage height of the first shelf group 13*a*. That is, the second shelves 11*b* can store both of a larger and higher second article W2 and a smaller and lower first article W1.

A plurality of the first shelves 11*a* are provided at the upper of the rack 1 and a plurality of the second shelves 11*b* are provided at the lower part of the rack 1, but it is not limited thereto. The first shelves 11*a* and the second shelves 11*b* may be arranged at any position. For example, the plurality of first shelves 11*a* may be arranged at the lower part of the rack 1 and the plurality of second shelves 11*b* may be arranged at the upper of the rack. Further, for example, the rack 1 may be divided into three parts: upper, middle, and lower parts, and the second shelves 11*b* may be arranged at the middle part and the first shelves 11*a* may be arranged at the upper and lower parts.

(3) Carrier

A plurality of the carriers 3 are capable of moving along X direction at the height position in response to each of the first shelves 11*a* and the second shelves 11*b*. In particular, for example, the plurality of carriers 3 are shuttle carriers to move back and forth along the X direction on the rail 3*a* placed at a height in response to each shelf. Each carrier 3 has a transfer device (not shown) to transfer an article from/onto and the corresponding shelf.

With the above structure, each of the carriers 3 moves in the X direction on the first shelf 11*a* or the second shelf 11*b* on which each carrier is located, while holding the first article W1 or the second article W2 to carry the first article W1 or the second article W2 being held by each in the X direction. Further, the first article W1 or the second article W2 can be transferred from/onto the first shelf 11*a* or the second shelf 11*b* corresponding to each carrier 3 using the transfer device provided at each carrier 3.

The size of each of the plurality of carrier 3 may be changed in accordance with the size of the article to be carried by itself. For example, a carrier 3 which is arranged correspondingly to the first shelf 11*a* to transfer the first article W1 may be smaller than a carrier 3 which is arranged correspondingly to the second shelf 11*b* to transfer the second article W2. Whereby, the carrier 3 arranged correspondingly to the first shelf 11*a* can be compact.

(4) Elevator

An elevator 5 is installed between the rack 1 and a storage/retrieval station 7 and includes an elevating platform 53, which can elevate along masts 51 in Z direction while holding a plurality of articles. The elevating platform 53 includes the transfer device such as conveyor to transfer the first article W1 and/or the second article W2 between the storage/retrieval station 7 and the first shelf 11*a* or the second shelf 11*b*.

With this configuration, the first article W1 and/or the second article W2 can be transferred from the storage/retrieval station 7 to the elevating platform 53. On the contrary, the first article W1 and/or the second article W2 held by elevating platform 53 can be transferred to the storage/retrieval station 7.

The first article W1 and/or the second article W2 being placed in the vicinity of the elevator 5 of the first shelf 11*a* or the second shelf 11*b* can be transferred to the elevating platform 53, on the contrary, the first article W1 and/or the second article W2 being held by the elevating platform 53 to the vicinity of the elevator 5 of the first shelf 11*a* or the second shelf 11*b*.

As shown in FIG. 2, the elevating platform 53 can hold a plurality of articles. This eliminates the need for operations to move the elevating platform 53 down to the storage/retrieval station 7, transfer an article between the storage/retrieval station 7 and the elevating platform 53, and then move it up again for each article.

(5) Controller

The controller 9 manages the storage and the storage/retrieval of articles in the automated warehouse 100, and controls the plurality of carriers 3 and the elevator 5 to perform storing or retrieving operations of articles W. The controller 9 is a computer system including a processor such as a CPU, a memory device such as ROM, RAM, HDD or SSD, and various interfaces such as A/D converter, D/A converter, or a communication interface.

The controller 9 may control each part by executing the program stored in a memory (corresponding to a part or all of memory area of a memory device) or may perform a part of control operations by hardware included therein.

The controller 9 may be actualized with a single computer system or a plurality of computer systems. When actualized with the plurality of computer systems, for example, the controller 9 may include a host controller to manage the operation of automated warehouse 100 such as storage and storage/retrieval of articles performed in the automated warehouse 100, a controller to control traveling of each carrier 3, and a controller to control a vertical movement of the elevating platform 53 of the elevator 5.

(6) Storage/Retrieval Operation in Automated Warehouse (6-1) Storage Operation

Figure 4:
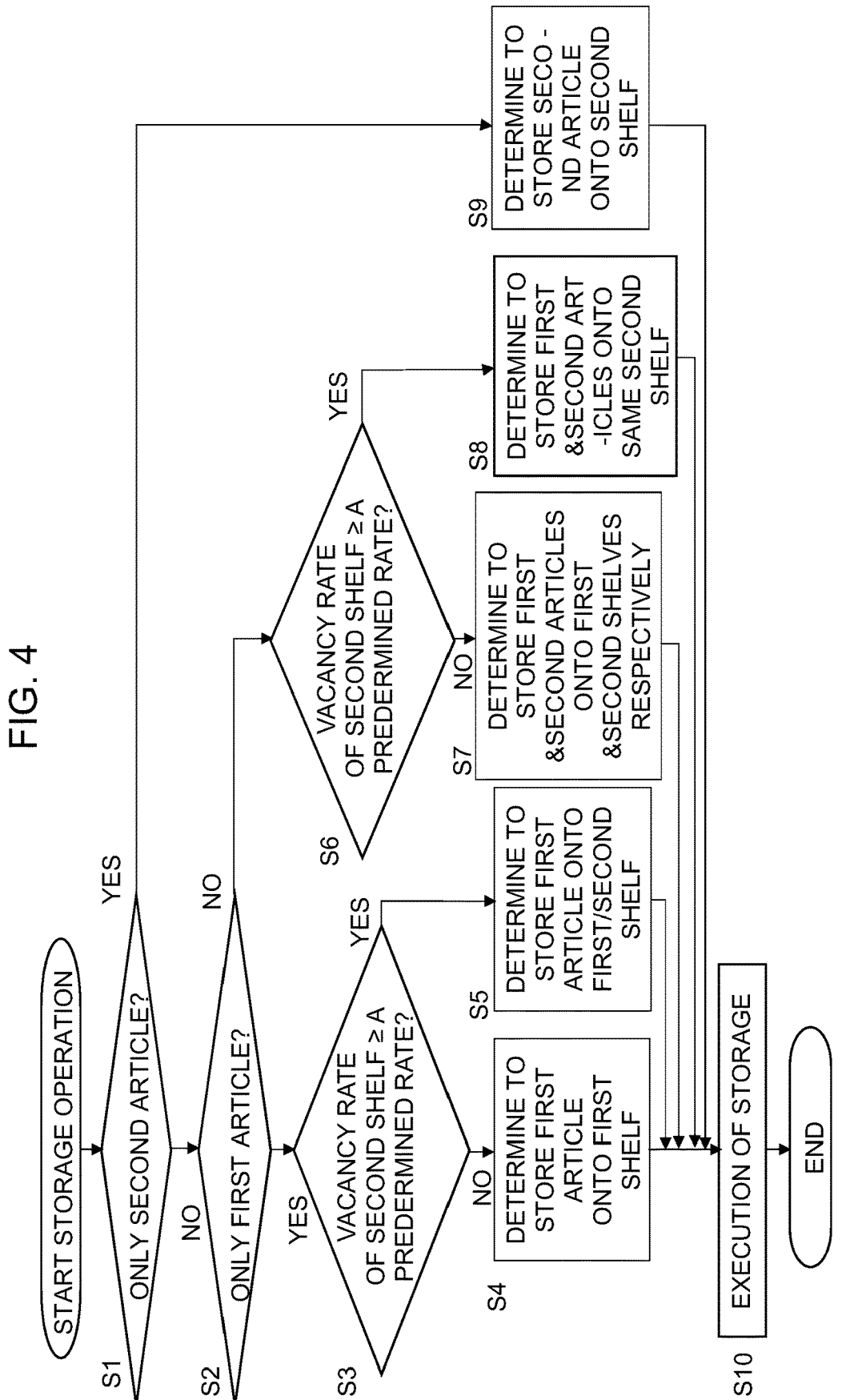
FIG. 4 is a flowchart showing a storing operation performed in the automated warehouse.

Hereinafter, with reference to FIG. 4, operations performed by the automated warehouse 100 according to the first example will now be described. FIG. 4 is a flowchart showing an operation of article storage in the automated warehouse 100.

From the data showing the schedule of article storage, the controller 9 preliminarily obtains information when and how the storage operation is performed during operations of the automated warehouse 100.

In response to a transferring of the article to be stored from the storage/retrieval station 7 to the vicinity of the elevator 5, the controller 9 judges at step S1 whether all of the articles to be stored are the second article W2 or not. "All of the articles to be stored are the second article W2" means, if a single article is to be stored, the article would be the second article W2, and if a plurality of the articles are to be stored, all of them would be the second articles W2.

When all of the articles to be stored are the second articles W2 ('Yes' at step S1), the process goes to step S9, where the controller 9 determines that the second articles W2 will be stored onto the second shelf 11b.

The controller 9 may determine, for example, that the second article W2 to be stored will be stored onto the second shelf 11b with the highest vacancy rate (to be described later), that is, with the largest space of the plurality of second shelf 11b, or may determine that the second article W2 will be stored onto the second shelf 11b by selecting the second shelf 11b in order from the top or from the bottom of the rack 1. Further, for example, the controller 9 may determine that the second article W2 will be stored on the second shelf 11b provided with a carrier 3 the operation time of which is the shortest.

Whereas, when the articles to be stored are not only the second articles W2, that is, include the first article W1 ('No' at step S1), the controller 9 further determines at step S2 whether the articles to be stored include only the first article W1 or both of the first article W1 and the second article W2. When a single article is to be stored, the above step S2 and step S6 to S8 are not executed. Because, when the single article is judged not to be the second article W2 at step S1, the article is determined to be only the first article W1.

(6-1-1) in Only the First Article to be Stored

How to determine the target shelf when the article to be stored is only the first articles W1 will now be described.

When the article to be stored is only the first article W1 ('Yes' at step S2), the controller 9 judges at step S3 whether vacancy rate of the second shelf 11b is equal to or more than the predetermined ratio or not. 'Vacancy rate' of the second shelf 11b can be defined as the ratio of the number of articles capable of being further stored to the total number of articles capable of being stored onto a second shelf 11b. In addition, the 'vacancy rate' may be defined as, for example, the ratio of area of the second shelf 11b on which articles can be further placed to the total area of the second shelf 11b on which articles can be placed. The 'predetermined ratio' which is a threshold of the 'vacancy rate' may be defined as, for example, a fixed value such as 50%.

As another preferred example, the above 'predetermined ratio' may be appropriately changed into the value predicted on the basis of the past results of the stored articles (for example, the number of the second articles W2 stored per day or per month) and the present situation of storage. For example, as the vacancy rate of the first shelf 11a becomes lower, the above 'predetermined ratio' may be lowered. In this way, as the vacancy rate of the first shelf 11a becomes lower, the above 'predetermined ratio' is lowered, whereby, the first smaller articles W1 can be stored more than the number of the articles W1 stored onto the first shelf 11a.

When it is judged that the articles to be stored are only the first articles W1 and the vacancy rate of the second shelf 11b is less than the predetermined ratio ('No' at step 3), the controller 9 determines at step S4 that the first articles W1 to be stored will be stored only onto the first shelf 11a. Which first shelf 11a of a plurality of first shelves 11a the first article W1 will be stored onto can be determined in the same way as the above-described step S9.

When it is judged that the articles to be stored are only the first articles W1 and the vacancy rate of the second shelf 11b is equal to or more than the predetermined ratio ('Yes' at step S3), the controller 9 determines at step S5 that the first articles W1 can be stored onto both of the first shelf 11a and the second shelf 11b. That is, the controller 9 allows the carrier 3 and the elevator 5 to store the first article W1 also onto the second shelf 11b.

In this process, the controller 9 can determine that the first article W1 will be stored onto the shelf with the largest vacancy rate among the first shelves 11a and the second shelves 11b, that the first article W1 be stored onto the shelf selected in order from the top or the bottom of the rack 1, and that the first article W1 be stored onto the shelf with the carrier 3 the operation time of which is the shortest among all carriers 3 included in the automated warehouse 100.

Further, for example, the controller 9 may determine that the article is allowed to be stored onto the second shelf 11b when the vacancy rates of all first shelves 11a are less than a certain threshold, that is, the available spaces of all first shelves 11a become small.

As described above, when the vacancy rate of the second shelf 11b is equal to or more than the predetermined ratio, the controller 9 of the automated warehouse 100 determines that the first article W1 can be stored also onto the second shelf 11b and, when the vacancy rate is less than the predetermined ratio, the controller 9 determines that the first article W1 can be stored only onto the first shelf 11a.

Whereby, in the automated warehouse 100, for example, when only a plurality of the first article W1 are requested to be continuously stored and the vacancy rate of the second shelf 11b is equal to or more than the predetermined ratio, the controller 9 can control the carriers 3 installed on the second shelves 11b to operate to store the first article W1. As a result, excessive access to the carrier 3 installed on a first shelf 11a to carry and transfer articles can be prevented.

(6-1-2) in the First Article and the Second Article to be Stored

How to determine the target shelf when a plurality of articles to be stored are mixtures of both of the first article w1 and the second article W2 will now be described. When mixtures of both of the first article w1 and the second article W2 are stored ('No' at step S2), the controller 9 judges at step S6 whether the vacancy rate of the second shelf 11b is equal to or more than predetermined ratio or not. Operations performed at step S6 is the same as those of step S3 described above and thus the detailed explanation is omitted.

When articles to be stored are mixtures of both of the first article W1 and the second article W2 and the vacancy rate of the second shelf 11b is less than the predetermined ratio ('No' at step S6), the controller 9 determines at step S7 that the first article W1 and the second article W2 of articles to be stored be stored onto the first shelf 11a and the second shelf 11b, respectively.

Whereas, when the vacancy rate of the second shelf 11b is equal to or more than the predetermined ratio ('Yes' at step S6), the controller 9 determines at step S8 that both of the first article W1 and the second article W2 be stored onto the same second shelf 11b.

When the controller 9 determines that both of the first article W1 and the second article W2 are stored onto the same second shelf 11*b*, the first article W1 and the second article W2 to be stored onto the same second shelf 11*b* are held by the elevating platform 53 in the elevator 5 at a time and carried to the targeted second shelf 11*b* with the elevating platform 53 at a time in the storage process of step S10 (to be described later).

As described above, when at least one of a plurality of the articles held by the elevating platform 53 is the second article W2, the controller 9 determines that the remaining first articles W1 will be stored onto the same second shelf 11*b*. That is, the controller 9 determines a storing location based on the second article W2 that cannot be stored onto the first shelf 11*a*.

Whereby, the second article W2 that cannot be stored onto the first shelf 11*a* and remaining first article W1 to be stored onto the same second shelf 11*b* together. As a result, the frequency of the elevating platform 53 stopping at each shelf and/or the traveling distance of the elevating platform 53 can be reduced.

According to another example, the controller 9 may determine at step S6 that the first article W1 and the second article W2 will be stored onto the shelves close to each other. This also reduces the traveling distance of the elevating platform 53.

After the above steps S1 to S9 is executed to determine the shelves onto which the articles will be stored, at step S10, the controller 9 controls the carrier 3 and the elevator 5 to store the articles to be stored onto the determined shelves in accordance with the above determination. Operations to store articles are performed as follows.

In accordance with the controller 9, the elevating platform 53 of the elevator 5 lifts and lowers to a position of transporting surface of the storage/retrieval station 7 and the articles to be stored are transferred from the storage/retrieval station 7 to the elevating platform 53 of the elevator 5. A plurality of articles to be stored, which are stacked on the storage/retrieval station 7, may be transferred to the elevating platform 53 at a time.

Next, in accordance with the controller 9, the elevating platform 53 holding the articles lifts and lowers to a position corresponding to the shelf onto which the articles to be stored were determined to be stored (target shelf) and the articles to be stored are transferred from the elevating platform 53 to the target shelf. If a plurality of articles to be stored are determined to be stored onto different shelves, respectively, the elevating platform 53 may stop at each target shelf and transfer each article thereto.

Then, in accordance with the controller 9, the carrier 3 installed on the target shelf moves to a position where the article to be stored is placed, and transfers the article to the carrier 3 from the target shelf.

In accordance with the controller 9, the carrier 3 installed on the target shelf and holding the article to be stored travels along the X direction, carries the article to the target position of the target shelf, and place the article onto the target shelf (6-2) Retrieval Operation The retrieval operations performed in the automated warehouse 100 will be described. From the data showing a retrieval schedule or the like, the controller 9 preliminarily obtains information on which articles are to be retrieved and when the articles are to be retrieved during operations of the automated warehouse 100.

In response to a starting of the retrieval operations, the controller 9 determines whether 'group retrieval' will be performed or not on the article to be retrieved shown in the retrieval schedule. The 'group retrieval' is a method to retrieve a plurality of articles designated based on the predetermined standard as a group. In this group retrieval, articles within a group may be retrieved in any order.

Figure 5:
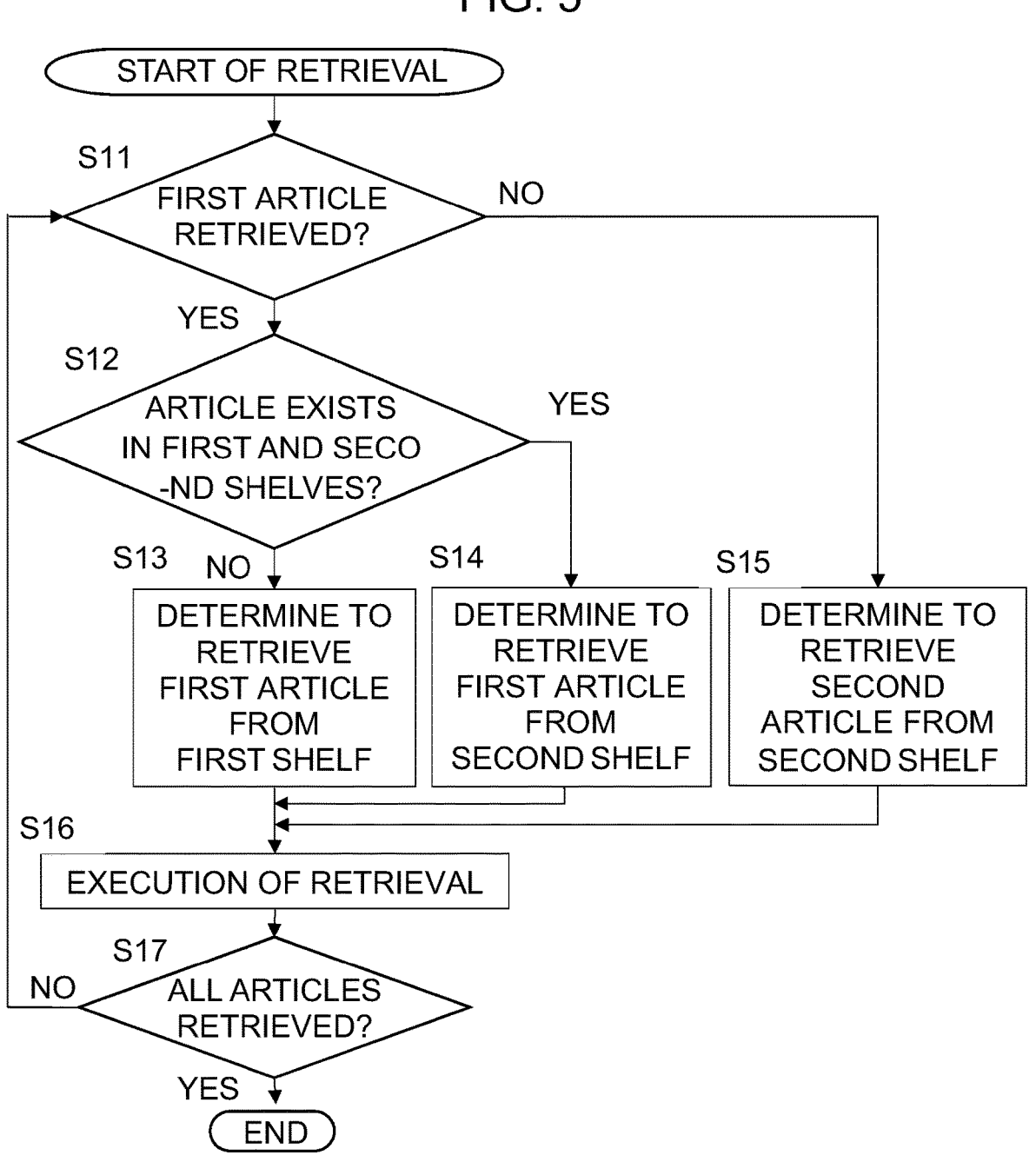
FIG. 5 is a flowchart showing a retrieving operation performed in the automated warehouse.

When the group retrieval is not performed, the controller 9 controls the carrier 3 and the elevator 5 to retrieve articles to be retrieved in accordance with the flowchart shown in FIG. 5, which shows retrieval operations without performing the group retrieval. Whereas, when the group retrieval is performed, the controller 9 controls the carrier 3 and the elevator 5 to retrieve articles to be retrieved in accordance with the flowchart shown in FIG. 6, which shows group retrieval operations.

(6-2-1) Retrieval Operations without Performing Group Retrieval

Hereinafter, with reference to FIG. 5, the detailed retrieval operations without group retrieval will now be described.

In response to a starting of a retrieval operation, which shelf an article is retrieved from is determined. In particular, the controller 9 judges at step S11 whether the article to be retrieved is the first article W1 or not. When the article to be retrieved is a second article W2 ('No' at step S11), it is determined at step S15 that the second article W2 to be retrieved will be retrieved from a second shelf 11*b*.

When the article to be retrieved is the first article W1 ('Yes' at step S11), the controller 9 determines at step 12 whether the same type of the first articles W1 are stored on both of the first shelves 11*a* and the second shelves 11*b*. The above 'the same type of the first articles W1' means, for example, a plurality of the first article W1 that have the same item code, the same expiry date, the same storing date, or the same production lot.

That is, the first articles W1 stored on the first shelf 11*a* and the first articles W1 stored on the second shelf 11*b* are considered as the same type of articles to be retrieved.

When the same type of the first articles W1 to be retrieved are stored only on the first shelf 11*a* ('No' at step S12), the controller 9 determines at step 13 that the first articles W1 will be retrieved from the first shelf 11*a*.

Whereas, when the same kind of the first articles W1 to be retrieved are stored on both of the first shelf 11*a* and the second shelf 11*b* ('Yes' at step S12), the controller 9 determines at step S14 that the first article W1 will be retrieved from the second shelf 11*b*.

As described above, when the same kind of the first articles W1 as the article to be retrieved are stored on both of the first shelf 11*a* and the second shelf 11*b*, the first article W1 is retrieved from the second shelf 11*b* preferentially, whereby, the space of the second shelf 11*b* can be ensured. Therefore, for example, the second shelf 11*b* is sure to store the second articles W2 without being filled with the first article W1.

After determining which shelf from which an article will be retrieved, the controller 9 controls the carrier 3 and the elevator 5 to retrieve the article from the determined shelf at step S16. Operations performed to retrieve an article to be retrieved at step 16 will now be described in detail as follows:

The controller 9 controls so that the carrier 3 installed on the retrieving target shelf which was determined for an article to be retrieved at step S11 to S15 can move to a position where the article to be retrieved is placed and transfer the article from the shelf.

Next, the controller 9 controls so that the carrier 3 holding the article can move to the vicinity of the elevator 5 and transfer the article to be retrieved to the retrieving target shelf from the carrier 3 at the position. Then, the controller 9 controls the elevator 5 to transfer the article to be retrieved from the retrieving target shelf to the elevating platform 53.

Finally, the controller 9 makes the elevating platform 53 holding the article to be retrieved move to the storage/retrieval station 7 to transfer the article to be retrieved from the elevating platform 53 to the storage/retrieval station 7.

If a plurality of articles to be retrieved have already been transferred onto the corresponding shelf, the controller 9 may make the elevating platform 53 hold the plurality of articles to be retrieved.

Until all of the articles instructed to be retrieved have been retrieved (until 'Yes' is selected at step S17), the above steps S11 to S16 are repeatedly carried out in the instructed order. That is, when the group retrieval is not performed, a plurality of articles to be retrieved are retrieved sequentially in order of a retrieval instruction.

During the retrieving operations performed from step S11 to S17, order of retrieval may be determined by raising the priority of the articles to be retrieved from the second shelf 11*b*. For example, the articles may be retrieved from the second shelf 11*b* preferentially.

(6-2-2) Retrieval Operations with Performing Group Retrieval

Figure 6:
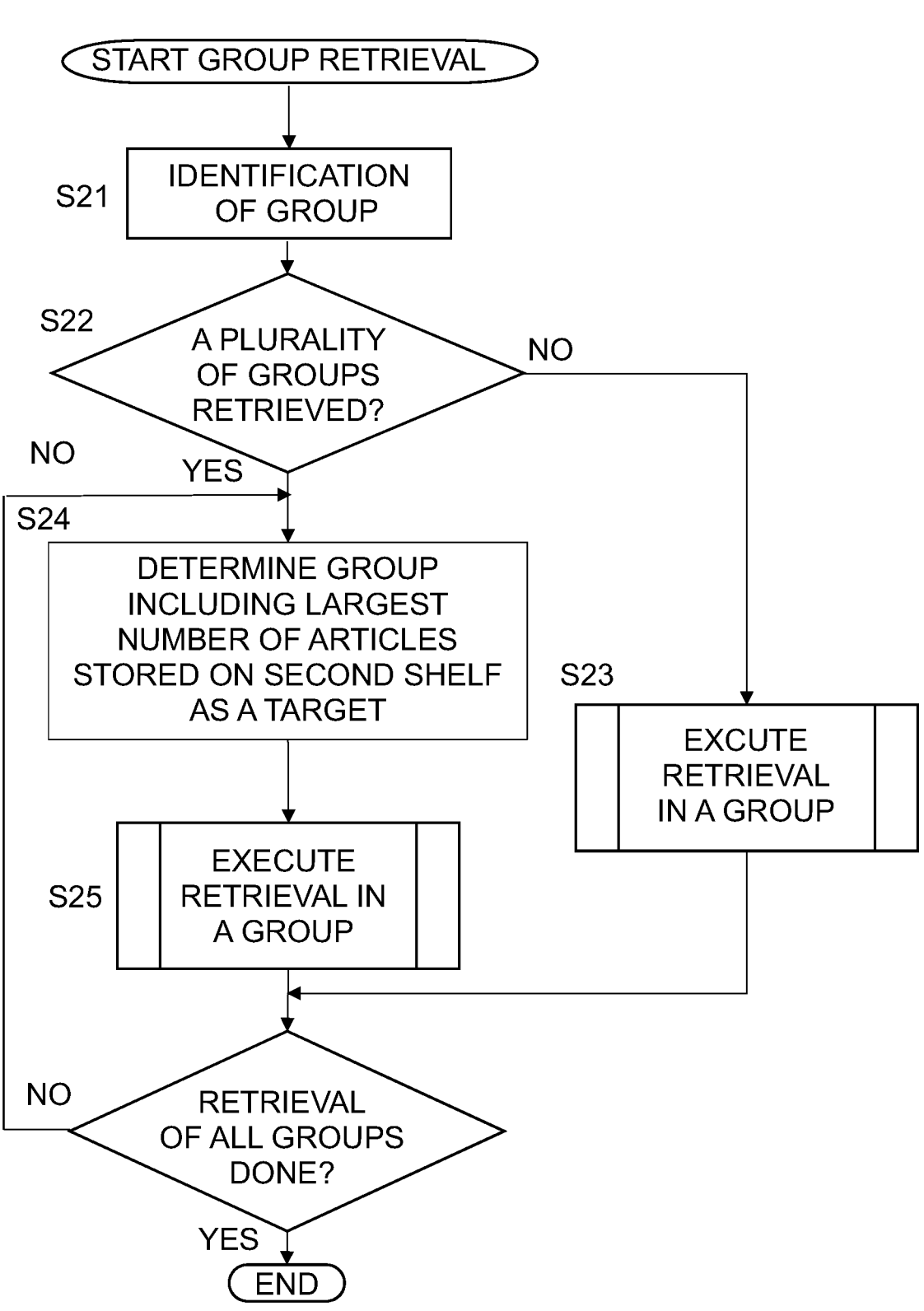
FIG. 6 is a flowchart showing a group retrieval performed in the automated warehouse.

With reference to FIG. 6, retrieval operations with performing group retrieval will now be described.

In response to starting of the group retrieval, the controller 9 identifies a group as a unit of the group retrieval at step S21. In particular, the controller 9 identifies a plurality of the articles for the same customer as a group in the group retrieval, for example.

Further, for example, a plurality of the articles determined per destination area, per arrival time at destination, or per a same delivery vehicle such as a truck may be identified as a group.

Next, the controller 9 determines at step S22 whether the group retrieval will be performed on a plurality of groups or not. If the group retrieval is performed on a single group ('No' at step S22), a 'retrieval in a group' is performed on this one group at step S23. The 'retrieval in a group' is referred to as a retrieval of an article included in one group. How the automated warehouse 100 performs operations of the retrieval in a group will be described later.

Whereas, if the group retrieval is performed on a plurality of groups ('Yes' at step S22), at step S24, the controller 9 determines which group of the plurality of groups is preferentially retrieved.

Specifically, the controller 9 determines a group that has not been selected as a retrieving target and includes the maximum number of articles (first article W1 and/or second article W2) being stored on the second shelf 11*b* to be a target group of retrieval. That is, the control 9 makes a group including the maximum number of articles and being stored on the second shelf 11*b* become a target of retrieval.

After determining a target group of retrieval from a plurality of groups, the controller 9 controls the carrier 3 and the elevator 5 at step S25 to perform the retrieval in a group on the selected group. The retrieval operation in a group performed at step S25 is the same as that at step S23.

The above-described operations of step S24 and S25 are repeatedly carried out until all of the plurality of groups have been retrieved (until 'Yes' is selected at step S26).

The above steps S21 to S26 are carried out to perform a group retrieval on the group having articles being stored on the second shelf 11*b*. Therefore, the second shelf 11*b* is sure to store the second articles W2 without being filled with the first article W1.

(6-2-3) Retrieving Operation in a Group

Next, with reference to FIG. 7, the specific operations of the automated warehouse 100 (carrier 3 and elevator 5) for the retrieval in a group performed at step S23 and S25 in the flowchart shown in FIG. 6 will be described as follows.

Figure 7:
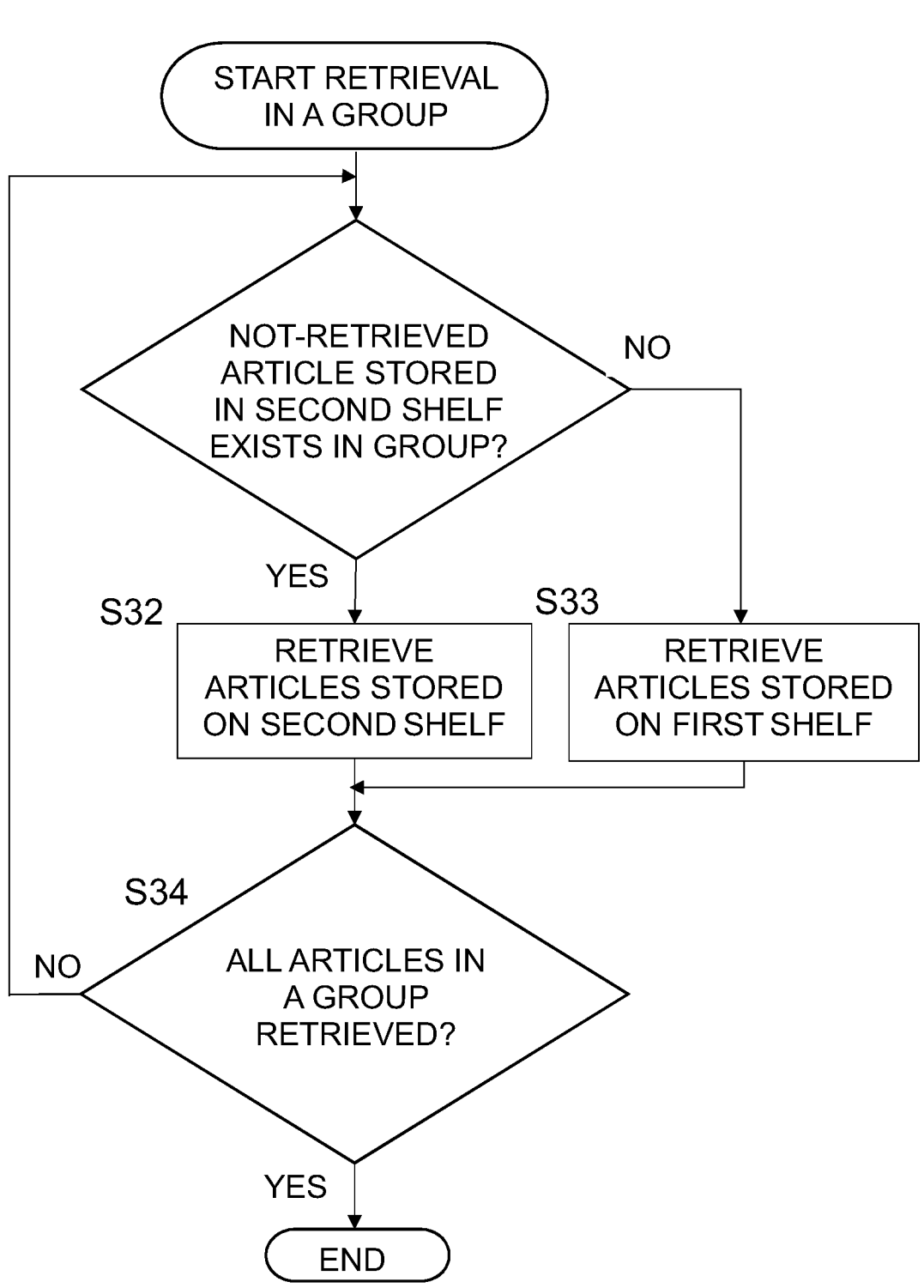
FIG. 7 is a flowchart showing a retrieval operation in a group performed in the automated warehouse.

FIG. 7 is a flowchart showing the retrieval in a group performed in the automated warehouse 100.

In response to starting of the retrieval in a group, the controller 9 determines at step S31 whether articles (the first article W1 and/or the second article W2) stored in the second shelf 11*b* are included or not in articles that are included in a group to be retrieved and have not been retrieved (referred to as 'articles awaiting retrieval').

If the articles awaiting retrieval include the articles being stored on the second shelf 11*b*, ('Yes' at step S31), the controller 9 controls the carrier 3 and the elevator 5 at step S32 to retrieve the articles being stored on the second shelf 11*b*. The details of operations to retrieve articles were described as above and thus are omitted herein.

If the articles awaiting retrieval do not include the articles being stored on the second shelf 11*b*, ('No' at step 31), the controller 9 controls the carrier 3 and the elevator 5 at step S33 to retrieve the first article W1 being stored on the first shelf 11*a*.

The above-described steps S31 to S33 are repeatedly carried out until articles of all group to be retrieved have been retrieved (until 'Yes' is selected at step S34).

If there are any articles stored in the second shelf 11*b* in a group including the plurality of articles to be retrieved, the articles stored in the second shelf 11*b* can be preferentially retrieved by carrying out the above-described steps S31 to S34. Therefore, the second shelf 11*b* is sure to store second articles W2 without being filled with the first articles W1.

(7) Feature of First Preferred Example

The above first example will be also described as follows:

An automated warehouse 100 (an example of automated warehouse) includes a first shelf group 13*a*, a second shelf group 13*b* (an example of shelf), a carrier 3 (an example of carrier), an elevator 5 (an example of elevator), and a controller 9 (an example of controller).

The first shelf group 13*a* and the second shelf group 13*b* are made up of a plurality of shelves.

The carrier 3 is provided on each shelf and carries articles.

The elevator 5 moves articles up and down.

The controller 9 controls the carrier and the elevator to store or retrieve articles onto or from the shelf.

The shelf of the automated warehouse system includes the first shelves 11*a* (example of first shelf) and the second shelves 11*b* (example of second shelf). The first shelves 11*a* stores a first articles W1. The second shelves 11*b*, which are larger than the first shelves 11*a*, are capable of storing the first articles W1 and second articles W2.

When the vacancy rate of the second shelf 11*b* is equal to or more than the predetermined ratio, the controller 9 allows the carrier 3 and the elevator 5 to store the first article W1 onto the second shelf 11*b*. Whereas, when the vacancy rate of the second shelf 11*b* is less than the predetermined ratio, the controller 9 controls the carrier 3 and the elevator 5 to store the first articles W1 only onto the first shelves 11*a*.

In the automated warehouse 100, when the vacancy rate of second shelf 11*b* is equal to or more than the predetermined ratio, the controller 9 allows the carrier 3 and the elevator 5 to store the first article W1 also onto the second shelf 11*b*. When the vacancy rate of the second shelf 11*b* is less than the predetermined ratio, the controller 9 controls the carrier 3 and the elevator 5 to store the first articles W1 only onto the first shelves 11*a*.

Whereby, in the automated warehouse 100, for example, when only a plurality of the first articles W1 are requested to be continuously stored and the vacancy rate of the second shelf 11*b* is equal to or more than the predetermined ratio, the controller 9 controls the carrier 3 installed on the second shelve 11*b* to operate to store the first articles W1 onto the second shelves 11*b*. As a result, excessive access to the carrier 3 installed on the first shelf 11*a* to carry and transfer articles can be prevented

2. Second Example

Figure 8:
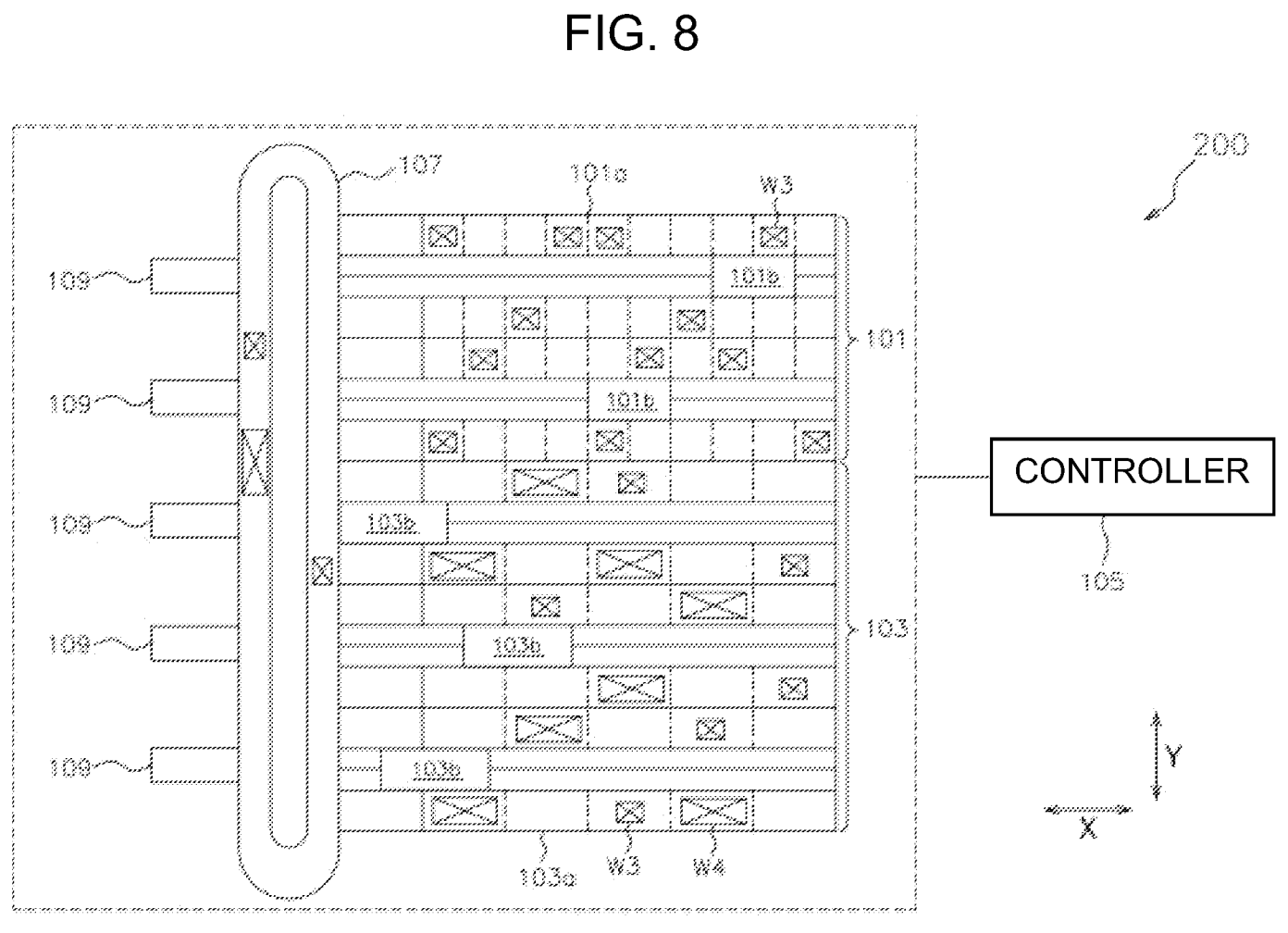

The storage control of the first article W1 and the Second Article W2 Described in the first example is also applicable to another automated warehouse (automated warehouse system). For example, the storage control of the first article W1 and the second article W2 described in the first example is applicable to an automated warehouse 200 described in FIG. 8. FIG. 8 shows an entire configuration of the automated warehouse 200 according to the second example.

Hereinafter, with reference to FIG. 8, the automated warehouse 200 according to the second example will now be described. The horizontal direction of FIG. 8 is referred to as a X direction and the vertical direction of FIG. 8 is referred to as a Y direction. The direction perpendicular to the X direction and the Y direction is referred to as a height direction.

The automated warehouse system 200 includes a first automated warehouse 101, a second automated warehouse 103, and a controller 105.

The first automated warehouse 101 stores a third article W3. Specifically, the first automated warehouse 101 includes a plurality of third shelves 101*a* and a first carrier 101*b*. The third shelf 101*a* extending to the X direction is capable of placing the third small article W3. The plurality of third shelves 101*a* are arranged at both sides of the first carrier 101*b* side by side in the Y direction and/or arranged at an enough interval to store the third article W3 in the height direction.

The first carrier 101*b* is a carrying device which has an transfer device capable of transferring the third article W3 between the third shelf 101*a* and the first carrier 101*b* and travels along the third shelf 101*a* extending direction (the X direction) to carry the third article W3. The first carrier 101*b* is, for example, a stacker crane.

The second automated warehouse 103 is capable of storing both of the third article W3 and a fourth article W4 larger than the third article W3. In particular, the second automated warehouse 103 has a plurality of fourth shelves 103*a* and second carriers 103*b*. The fourth shelf extending in the X direction is capable of placing both of the third article W3 and the fourth article W4. The plurality of fourth shelves 103*a* are arranged at both sides of the second carrier 103*b* side by side in the Y direction and/or arranged at an enough interval to store the third article W3 and the fourth article W4 in the height direction.

The second carrier 103*b* is a carrying device which has an transfer device capable of transferring the third article W3 and the fourth article W4 between the fourth shelf 103*a* and the second carrier 103*b* and travels along extending direction (the X direction) of the fourth shelf 103*a* to carry the fourth article W4. The second carrier 103*b* is, for example, a stacker crane.

The controller 105 manages the custody and the storage/retrieval of the third article W3 and the fourth article W4, and controls the first carrier 101*b* and the second carrier 103*b* to store or retrieve the third article W3 and the fourth article W4.

The controller 105 is a computer system including a processor such as CPU, a memory such as ROM, RAM, HDD, or SSD, and an interface such as A/D convertor, D/A convertor, or a communication interface.

The automated warehouse system 200 includes a conveyor 107 that carries the third article W3 and the fourth article W4 among a storage/retrieval station 109, the first automated warehouse 101 (the third shelf 101*a*), and the second automated warehouse 103 (the fourth shelf 103*a*).

In the automated warehouse system 200 with the above configuration, when the vacancy rate of the fourth shelf 103*a* is equal to or more than the predetermined ratio, the controller 105 allows the second carrier 103*b* to store the third article W3 also onto the fourth shelf 103*a*.

When the vacancy rate of the fourth shelf 103*a* is less than the predetermined ratio, the controller 105 allows the first carrier 101*b* only to store the third article W3 onto the third shelf 101*a* without allowing the second carrier 103*b* to store the third article W3 onto the fourth shelf 103*a*.

With this configuration, in the automated warehouse system 200 according to the second example, for example, when only a plurality of the third article W3 are requested to be continuously stored and the vacancy rate of the fourth shelf 103*a* is equal to or more than the predetermined ratio, the controller controls not only the first carrier 101*b* but also the second carrier 103*b* to store the third article W3 onto the fourth shelf 103*a*. As a result, an excessive access to the first carrier 101*b* to carry the third article W3 can be prevented.

3. Another Example

A plurality of examples are described as above, however, this disclosure is not limited to the above examples. Various changes can be made without departing from the scope of the disclosure. A plurality of the examples and variations described herein may be combined as appropriate.

(A) The order and/or the process of each step of the flowcharts shown in FIGS. 4 to 7 may be changed within the scope of the disclosure in an appropriate manner.

(B) According to the first preferred example, the first shelf 11*a* stores the first lower article W1 and the second shelf 11*b* stores the second higher article W2. However, it is not limited to that specific structure. Even when specific shelves in accordance with the width of articles (for example, a shelf for wide articles or a shelf for narrow articles) are provided, the above-described methods of storing and retrieving article are applicable.

In this instance, the control 9 may determine which shelf an article is stored and/or retrieved onto/from, on the basis of the width of the article. Further, the controller 9 may determine the shelf onto/from which an article is stored and/or retrieved in view of both of the height and width of the article.

(C) In the first example and the second example, 'Vacancy rate' is defined as the ratio of the number of articles capable of being further stored into a second shelf to the total number of articles capable of being stored in the second shelf or is defined as, for example, the ratio of area on which articles can be further placed to the total area of the second shelf 11*b* on which articles can be placed.

However, it is not limited to that ratio. The controller 9 may determine whether the first article W1 is allowed or not to be stored onto the second shelf in accordance with the number defined based on the vacancy rate. For example, the number of articles capable of being further stored onto the second shelf, or the number of vacant second selves with no articles placed can be used as the number defined based on the vacancy rate.

(D) Even if the priority per group is not determined during the group retrieval, the articles being stored on the second shelf 11*b* may be determined to be preferentially retrieved during the retrieval in each group.

(E) In the automated warehouse 100 according to the first example and the automated warehouse system 200 according to the second example, in addition to small articles (the first article W1, the third article W3) and large articles (the second article W2, the fourth article W4), the articles intermediate between the small article and the large article may also be capable of being stored and retrieved. This medium-sized articles may include various-sized articles. In this example, two or more types of shelves may be provided at the rack in accordance with an article capable of being stored or retrieved.

(F) If it is known, in storing a specific article, that another article to be retrieved with the specific article during a retrieval operation is stored on a second shelf 11*b* at present, the controller 9 may control the carrier 3 and the elevator 5 so that the specific article can be stored onto the second shelf 11*b* on which another article is stored.

This enables the above-described specific article and another article to be carried by the elevator 5 at a time when these two articles are retrieved together. As a result, the elevator 5 can be used efficiently during the retrieval operation.

(G) The group of the group retrieval may include a single article.

Our warehouse, methods, programs and systems are widely applicable to an automated warehouse system where a plurality of the shelves to store articles are provided and the carriers to carry articles are provided at each shelf.

The invention claimed is:

1. An automated warehouse for storing a plurality of articles including a plurality of first articles and/or a plurality of second articles, wherein each second article is larger than each first article, the automated warehouse comprising:

a plurality of shelves, each shelf including a carrier configured to carry at least one of the plurality of articles to or from the shelf on which the carrier is installed;

wherein the plurality of shelves includes a set of first shelves, wherein each first shelf is sized and configured to store one or more articles selected only from the plurality of first articles, and a set of second shelves, each second shelf being larger than each first shelf, wherein each second shelf is sized and configured to store a plurality of articles which may include one or more article which may be selected from either or both the plurality of first articles and the plurality of second articles;

an elevator configured to move one or more article selected from the plurality of articles up or down between the plurality of shelves; and a controller controlling each carrier and the elevator to store/retrieve the one or more article selected from the plurality of articles onto/from a selected shelf from the plurality of shelves, wherein the selected shelf is determined based upon a vacancy rate, such that when the selected shelf is a second shelf, and a vacancy rate of the second shelf is equal to or more than a predetermined ratio, the controller allows the carrier and the elevator to store either a first article or a second article onto the second shelf, and when the vacancy rate of the second shelf is less than the predetermined ratio, the controller controls the carrier and the elevator to store a first article only onto a first shelf.

2. The automated warehouse according to claim 1, wherein, when an article to be retrieved is stored in both of the set of first shelves and the set of second shelves, the controller controls the carrier and the elevator to retrieve the articles from the set of second shelves.

3. The automated warehouse according to claim 1, wherein the elevator has an elevating platform capable of holding and lifting/lowering one or more articles to be stored/retrieved from the plurality of articles and, when at least one of the one or more articles to be stored/retrieved by the elevating platform is the second article, the controller controls the carrier and the elevator to store all of the one or more articles to be stored/retrieved on the elevating platform onto the set of second shelves.

4. The automated warehouse according to claim 1, wherein the elevator has an elevating platform capable of holding and lifting/lowering one or more article to be stored/retrieved of the plurality of articles, and when it is known, in storing a specific article, that remaining one or more other articles to be stored/retrieved together with the specific article to be stored are stored on the second shelf at present, the controller controls the carrier and the elevator to store the specific article onto the set of second shelves where the other articles are stored.

5. The automated warehouse according to claim 1, wherein, to perform a group retrieval to retrieve a plurality of articles designated by a predetermined standard, the controller controls the carrier and the elevator to perform the group retrieval preferentially on a group having articles being stored on the set of second shelves among a plurality of groups subject to the group retrieval.

6. The automated warehouse according to claim 5, wherein, if a group to be retrieved includes an article being stored on the set of second shelves, the controller controls the carrier and the elevator to preferentially retrieve the article from the set of second shelves.

7. A method of controlling an automated warehouse comprising:

a plurality of shelves including a set of first shelves storing first articles and a set of second shelves larger than the first shelves and capable of storing first articles and second articles larger than the first articles;

each shelf being provided with a carrier carrying articles on that shelf; and an elevator that moving articles up and down between shelves, the method comprising:

allowing a first article to be stored onto a second shelf when a vacancy rate of the second shelf is equal to or more than the predetermined ratio;

determining a first article to be stored onto only a first shelf when the vacancy rate of the second shelf is less than a predetermined ratio; and causing a selected carrier and the elevator to store the first article onto the first shelf or the second shelf onto which the first article was determined to be stored.

8. A program that causes a computer to execute the method of controlling automated warehouse according to claim 7.

9. An automated warehouse system comprising:

a first automated warehouse including a third shelf that stores a third article and a first carrier that carries the third article;

a second automated warehouse including a fourth shelf larger than the third shelf and capable of storing the third article and a fourth article larger than the third article, and a second carrier capable of carrying the third article and the fourth article; and a controller that controls the first carrier and the second carrier, wherein, when a vacancy rate of the fourth shelf is equal to or more than a predetermined ratio, the controller allows the second carrier to store the third article also onto the fourth shelf and, when the vacancy rate of the fourth shelf is less than the predetermined ratio, the controller allows the first carrier to store the third article only onto the third shelf.

\*    \*    \*    \*    \*